(12) United States Patent
Ioppolo et al.

(10) Patent No.: US 11,420,536 B2
(45) Date of Patent: Aug. 23, 2022

(54) VEHICLE SEAT GEARBOX BRACKET

(71) Applicant: Brose Fahrzeugteile SE & Co. Kommanditgesellschaft, Coburg, Coburg (DE)

(72) Inventors: Leo Ioppolo, Washington Township, MI (US); Alan McKeown, Pontiac, MI (US); Christopher Cebula, Livonia, MI (US)

(*) Notice: Subject to any disclaimer, the term of this patent is extended or adjusted under 35 U.S.C. 154(b) by 217 days.

(21) Appl. No.: 16/896,296

(22) Filed: Jun. 9, 2020

(65) Prior Publication Data

US 2021/0380024 A1 Dec. 9, 2021

(51) Int. Cl.
*B60N 2/07* (2006.01)
*B60N 2/90* (2018.01)
*B60N 2/015* (2006.01)

(52) U.S. Cl.
CPC ....... *B60N 2/0715* (2013.01); *B60N 2/01508* (2013.01); *B60N 2/90* (2018.02); *B60N 2/0727* (2013.01)

(58) Field of Classification Search
CPC ..... B60N 2/0715; B60N 2/90; B60N 2/01508
See application file for complete search history.

(56) References Cited

U.S. PATENT DOCUMENTS

| | | | | |
|---|---|---|---|---|
| 10,857,912 B2* | 12/2020 | Rey | ........................ | B60N 2/067 |
| 2006/0249644 A1* | 11/2006 | Folliot | ........................ | 248/429 |
| 2015/0210187 A1 | 7/2015 | Harleb et al. | | |
| 2015/0367752 A1* | 12/2015 | Chang | ........................ | B60N 2/067 |
| | | | | 74/89.42 |
| 2018/0065507 A1* | 3/2018 | Napau | ........................ | B60N 2/06 |

FOREIGN PATENT DOCUMENTS

WO 2011098161 A1 8/2011

* cited by examiner

*Primary Examiner* — Anthony D Barfield
(74) *Attorney, Agent, or Firm* — Brooks Kushman P.C.

(57) ABSTRACT

The vehicle seat may include a fixed portion, a moveable portion, a gearbox, and a reinforcement bracket. The gearbox may be fixed to either the fixed portion or the moveable portion and may be configured to move the moveable portion with respect to the fixed portion. The reinforcement bracket may include a first end portion, a second end portion, and a medial portion that may extend therebetween. The first end portion may define a first U-shaped opening, the second end portion may form a second U-shaped opening, and the medial portion may form a third U-shaped opening that may receive the gearbox.

19 Claims, 7 Drawing Sheets

VEHICLE SEAT GEARBOX BRACKET

TECHNICAL FIELD

The present disclosure relates to vehicle seats including actuation mechanisms of the same.

BACKGROUND

Vehicle seats may include a number of adjustment mechanisms used to adjust one or more positions of the seat to suit an occupant's desired seated position or posture. To adjust portions of the vehicle seat, an electric motor or a manual drive may be provided to actuate a gearbox or a spindle that moves one portion of the seat with respect to another portion of the seat.

SUMMARY

According to one embodiment, a vehicle seat is provided. The vehicle seat may include a fixed bracket, a moveable bracket, a spindle, a gearbox, and a reinforcement bracket. The moveable bracket may be configured to translate with respect to the fixed bracket. The spindle may be fixed to the fixed bracket or the moveable bracket. The gearbox may be coupled to the moveable bracket and may be provided with a gear that engages the spindle. The reinforcement bracket may receive the spindle and may include a first inner wall, a second inner wall, a bottom wall, a first top wall, a second top wall, and a first vertical wall. The second inner wall may be spaced apart from the first inner wall along the longitudinal axis. The first inner wall and the second inner wall may each extend in a first direction and define an aperture that may receive the spindle. The bottom wall may extend between the first inner wall and the second inner wall. The first top wall may extend from the first inner wall along the longitudinal axis in a second direction. The second top wall may extend from the second inner wall in a third direction. The first vertical wall may extend in a fourth direction, different from the first, second, and third directions, from the top wall and terminating the first inner wall and bottom wall.

According to another embodiment, a vehicle seat is provided. The vehicle seat may include a fixed portion, a moveable portion, a gearbox, and a reinforcement bracket. The gearbox may be fixed to either the fixed portion or the moveable portion and may be configured to move the moveable portion with respect to the fixed portion. The reinforcement bracket may include a first end portion, a second end portion, and a medial portion that may extend therebetween. The first end portion may define a first U-shaped opening, the second end portion may form a second U-shaped opening, and the medial portion may form a third U-shaped opening that may receive the gearbox.

According to yet another embodiment, a rail assembly for use in vehicle seat is provided. The rail assembly may include a fixed rail, configured to be coupled to a vehicle floor, a translatable rail, a spindle fixed to the fixed rail, a gearbox disposed on the spindle and configured to carry the translatable rail along the fixed rail, and a reinforcement bracket. The reinforcement bracket may include a first end portion, a second end portion, and a medial portion that may extend therebetween. The first end portion may define a first U-shaped opening, the second end portion may form a second U-shaped opening, and the medial portion may form a third U-shaped opening that may receive the gearbox.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

Under certain conditions, the length adjustment system may be required to withstand significant forces, often exceeding 25 Kn, associated with a forward or rearward collision. Known vehicle seats use gearbox brackets that may partially surround the gearbox and may be configured to deform in a relatively controlled manner such that the forces are dissipated as the gearbox bracket undergoes plastic deformation. Under certain conditions, such as higher loads or more stringent seatbelt deflection requirements, reinforcements or alternative, often more expensive, materials may be required.

Known solutions have used additional parts, such as a reinforcement member formed of high-strength materials, such as a sintered block. Other examples include forming the gearbox bracket with high-strength steel or welding reinforcement brackets to engage the gearbox during a vehicle event such as a front or rear collision.

Figure 1:
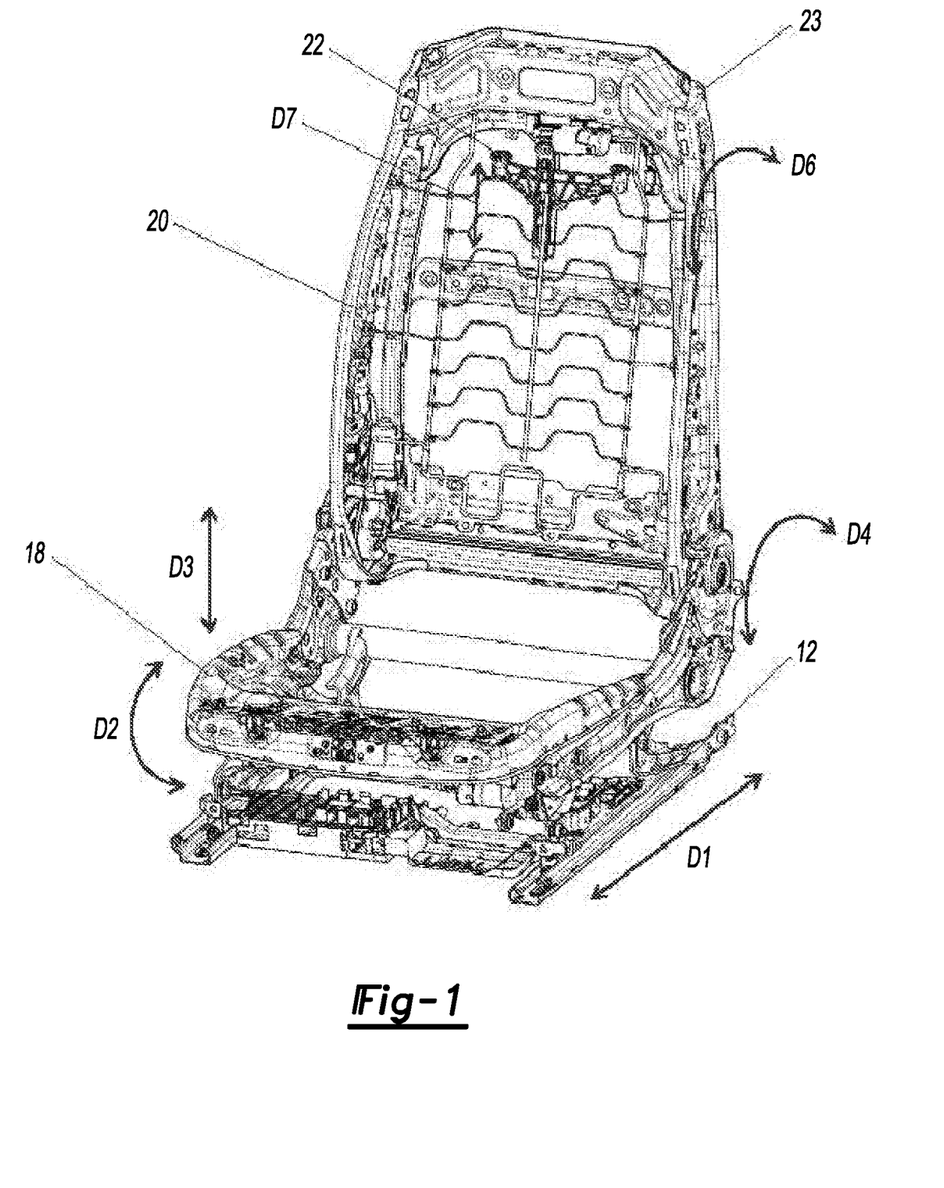
FIG. 1 illustrates a perspective view of an exemplary vehicle seat.

FIG. 1 illustrates a perspective view of an exemplary vehicle seat 10. The vehicle seat may include a number of mechanisms each configured to adjust a one or more moveable parts or portions of the vehicle seat. For example, the seat 10 may include a rail assembly 12 including fixed rails 14 and moveable rails 16 that may be configured to a cushion 18 in a longitudinal direction D1. The vehicle seat 10 may include a tilt adjuster that may be configured to adjust the incline or decline of the seat along D2. A height adjustment mechanism may be provided to move the cushion 18 along D3 with respect to the rail assembly or rail assemblies 12.

The vehicle seat may include a backrest 20 that may be actuated or tilted along D4 by a recliner or another suitable mechanism. The backrest may include a head restraint mechanism 22 that may be configured to actuate e.g., translate the head restraint (not shown) along D7. The backrest 20 may include an upper portion 23 that may be tilted or adjusted along D6 to support the head or neck portion of an occupant.

Figure 2:
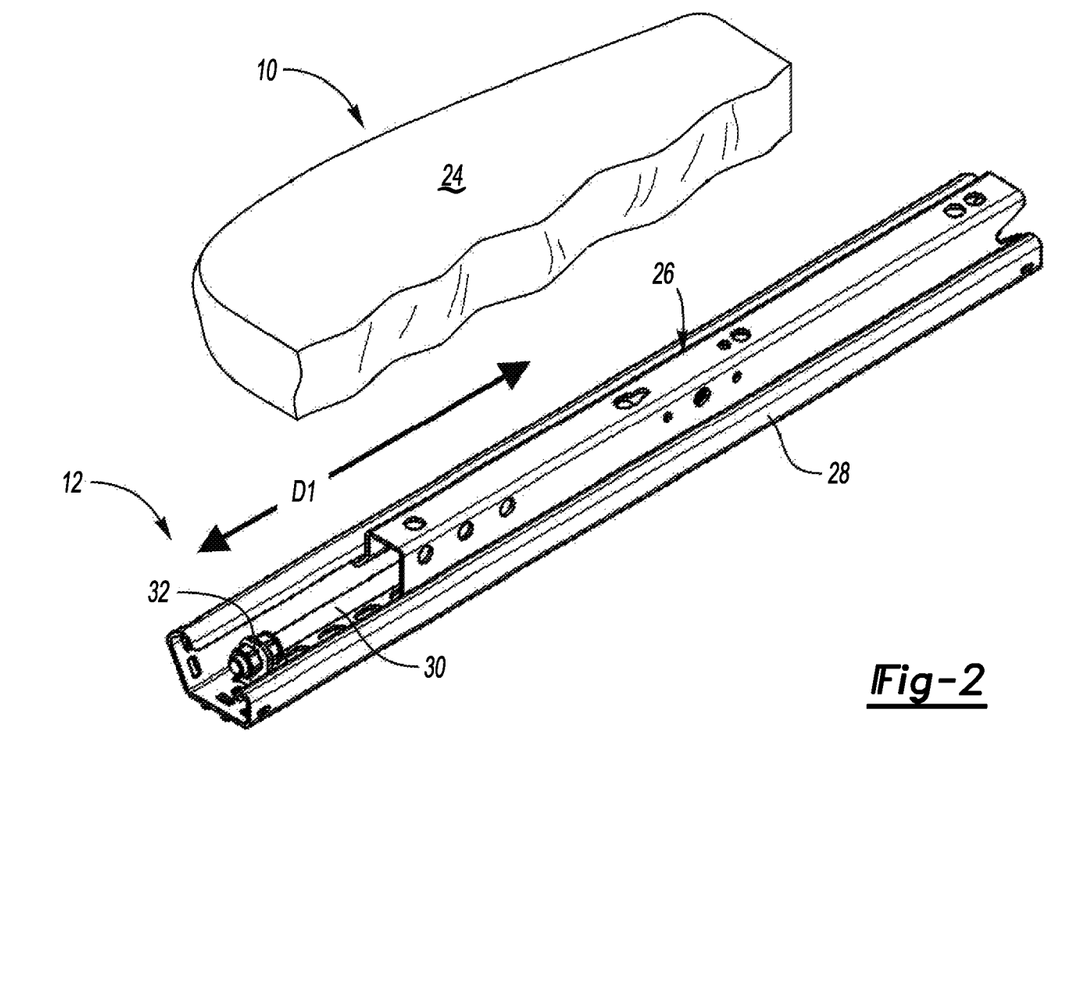
FIG. 2 illustrates a partial-perspective of a portion of the vehicle seat.
Figure 3:
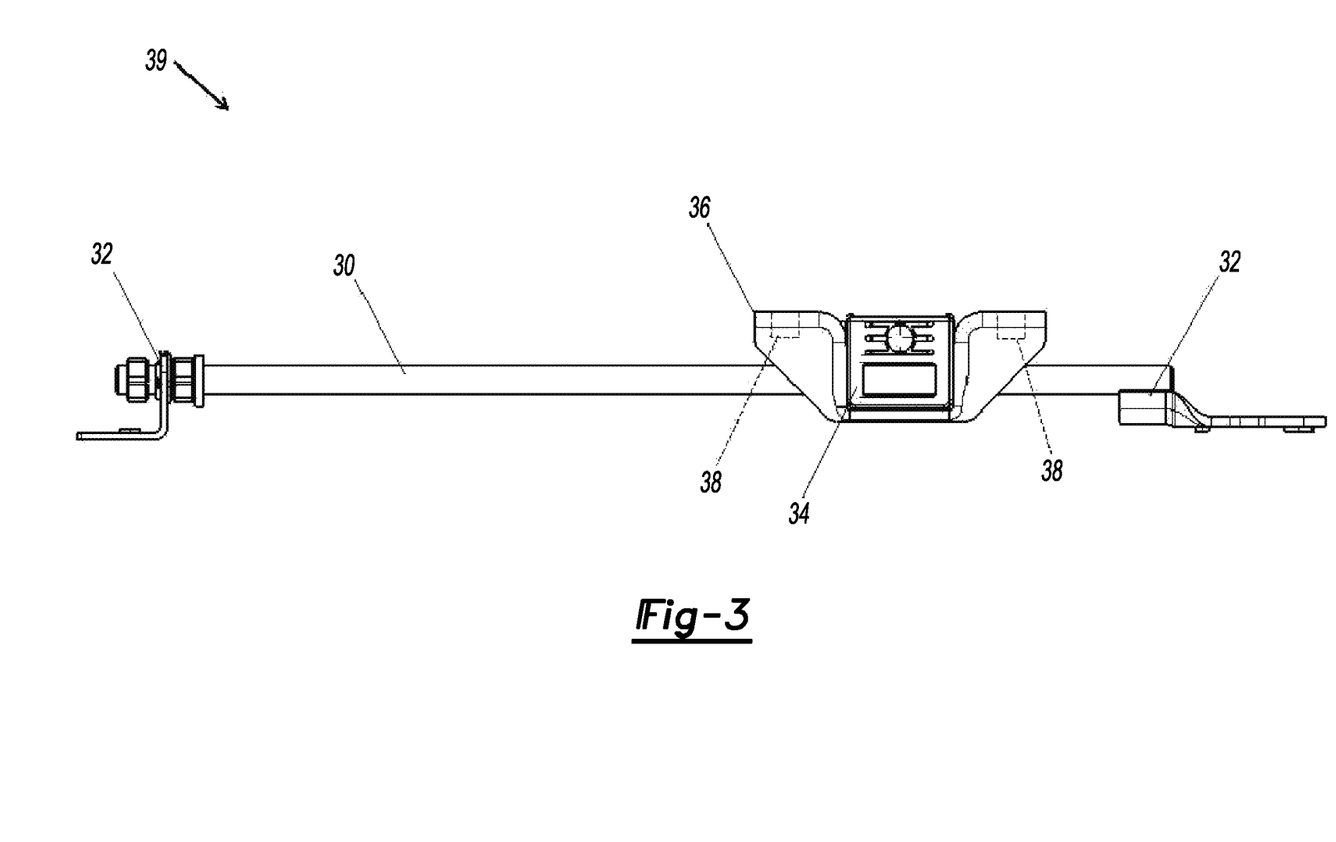
FIG. 3 illustrates a plan view of an exemplary spindle, gearbox and reinforcement bracket.

FIG. 2 illustrates a partial-perspective view of a portion of the seat 10. The vehicle seat 10 may include the cushion pan 24 and the rail assembly 12. The rail assembly 12 may include a movable portion such as a movable longitudinal rail 26 that may be configured to translate along a fixed longitudinal rail 28 in direction D1. The rail assembly 12 may include a spindle 30, a gearbox 34 (FIG. 3) and a reinforcement bracket 36 (FIG. 3). The reinforcement bracket 36 may be fixed to the movable rail 26 and the gearbox may translate the movable rail to a forward most position, such as the end stop 32.

In one or more embodiments, the reinforcement bracket 36 may be formed of one or more metals such as steel, aluminum, magnesium, or any other suitable metal. As an example, the reinforcement bracket 36 may be formed by a deep drawn steel material such as DC04 (DIN EN standard) having a tensile strength ranging between 270 MPa and 350 MPa. Alternatively, other similar materials having a tensile strength ranging between 225 MPa and 525 MPa may be used.

As another example, the reinforcement bracket 36 may be formed of a plastic or polymeric material. The plastic or polymeric material may be reinforced with a number of fibers such as carbon or glass. "Plastic" may refer to a polymeric material consisting of a wide range of synthetic or semi-synthetic organic compounds that are malleable and capable of being molded into solid objects.

FIG. 3 illustrates a plan view of an exemplary spindle assembly 39 that may include the spindle 30 that may extend between a first end stop and a second end stop 32. The gearbox 34 may be disposed on and translate along the spindle 30 between the first and second end stop 32. The reinforcement bracket 36 may receive the gearbox 34. One or more portions of the reinforcement bracket 36 may include one or more threaded extrusions 38. The threaded extrusions 38 may be configured to receive a fastener to fix the movable portion or movable rail 26 to the reinforcement bracket 36.

Figure 4:
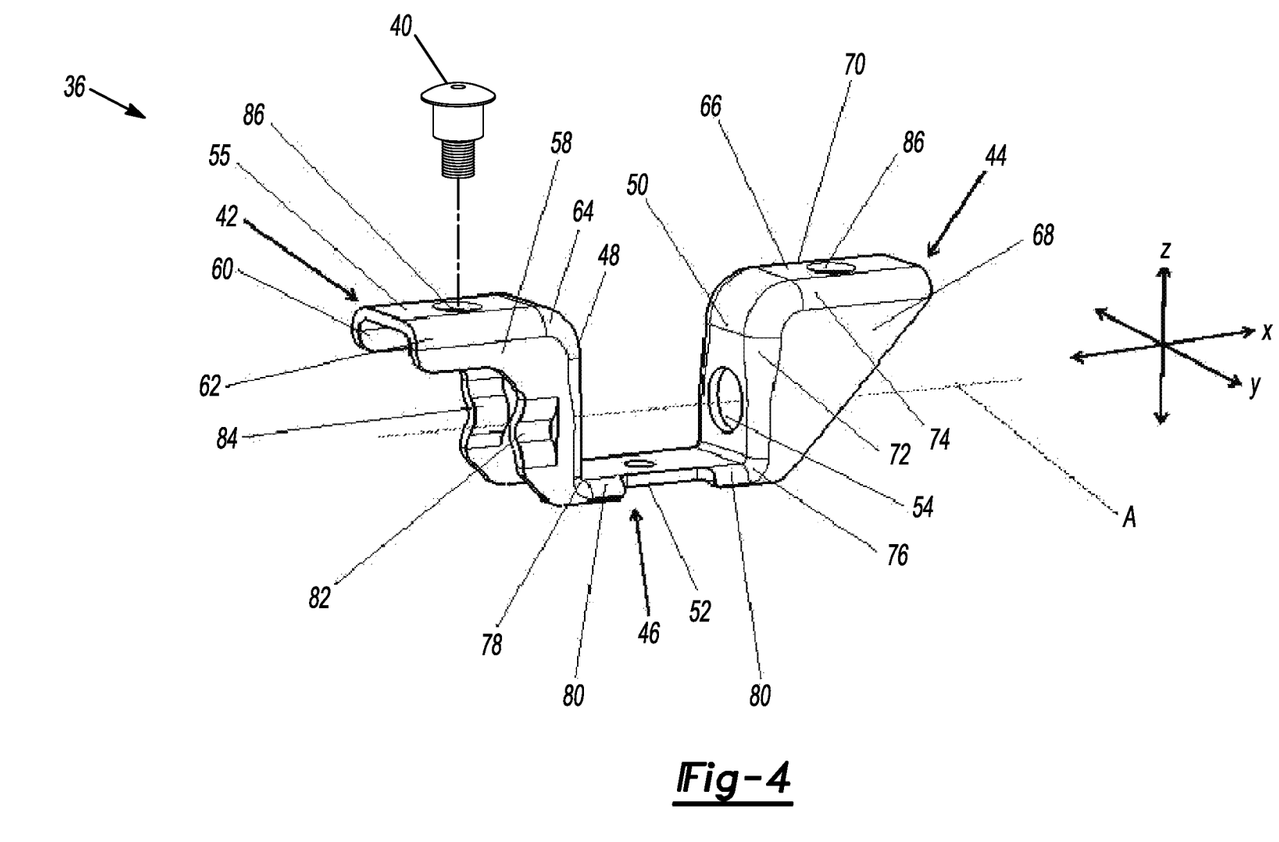
FIG. 4 illustrates a perspective view of a reinforcement bracket and fastener according to one or more embodiments.

FIG. 4 illustrates a perspective view of the reinforcement bracket 36 and an exemplary fastener 40. The reinforcement bracket 36 may include a first end portion 42 that may form a first U-shaped opening, a second end portion 44 that may define a second U-shaped opening, and a medial portion 46 that may define a third U-shaped opening.

The third U-shaped opening formed by the medial portion 46 may be sized and arranged to receive the gearbox 34. The medial portion may be formed by a first inner wall 48, a second inner wall 50, and a bottom wall 52 that may extend between the first inner wall 48 and the second inner wall 50. The first and second inner walls 48, 50 may each extend in a vertical or z-direction and the bottom wall 52 may extend along the longitudinal or x-direction. The first and second inner walls 48, 50 may each define an aperture 54 that may receive the spindle 30. A longitudinal axis A may extend between the apertures 54.

The first end portion 42 may include a first top wall 55 that may extend in the x-direction or in a direction parallel to the longitudinal axis A. A first vertical wall 58 and a second vertical wall 60 may each extend from the first top wall 55 substantially in the z-direction. The vertical walls 58, 60 may each be connected to or extend to the top wall 55 and the first inner wall 48 by a number of radii, 62 and 64, respectively. In one or more embodiments, the first vertical wall 56 and the second vertical wall 60 may each be connected to the bottom wall 52 by a radius 78.

The geometry of the reinforcement bracket 36 may be shaped by using a progressive stamping die, that may include punching, coining, bending and several other ways of modifying metal raw material, combined with an automatic feeding system. Progressive stamping may allow work-hardening of the material as the material is stamped. Work hardening the material may provide additional strength so that a lower-grade, less expensive material may be used. As an example, portions of the reinforcement bracket near reference numbers 58 and 74 may be work hardened so that these portions are relatively stronger than other portions of the reinforcement bracket 36.

The second end portion 44 may include a second top wall 66 that may extend in the x-direction or in a direction parallel to the longitudinal axis A. A third vertical wall 68 and a fourth vertical wall 70 may each extend from the second top wall 66 substantially in the z-direction. The third and fourth vertical walls 68, 70 may each be connected to or extend to the second top wall 66 and the second inner wall 50 by a number of radii, 72 and 74, respectively. In one or more embodiments, the third vertical wall 68 and the fourth vertical wall 70 may each be connected to the bottom wall 52 by a radius 76. One or more protrusions 80 may extend from the bottom wall 52 to the radius 76 and the radius 78. The protrusions 80 may be formed to transfer force applied to the vertical walls 58, 60, 68, 70 to the bottom wall 52.

In one or more embodiments, the first vertical wall 58 and the second vertical wall 60 may each include a number of tabs 82, 84 that may extend towards the longitudinal axis A. The tabs 82, 84 may be configured to engage one of the end stops 32. The first and second top walls 55, 66 may each define an aperture 86 that may receive the fastener 40. In one or more embodiments, the fastener 40 may be an M7 or M6 or a fastener having a diameter that is less than 6 mm.

Figure 5:
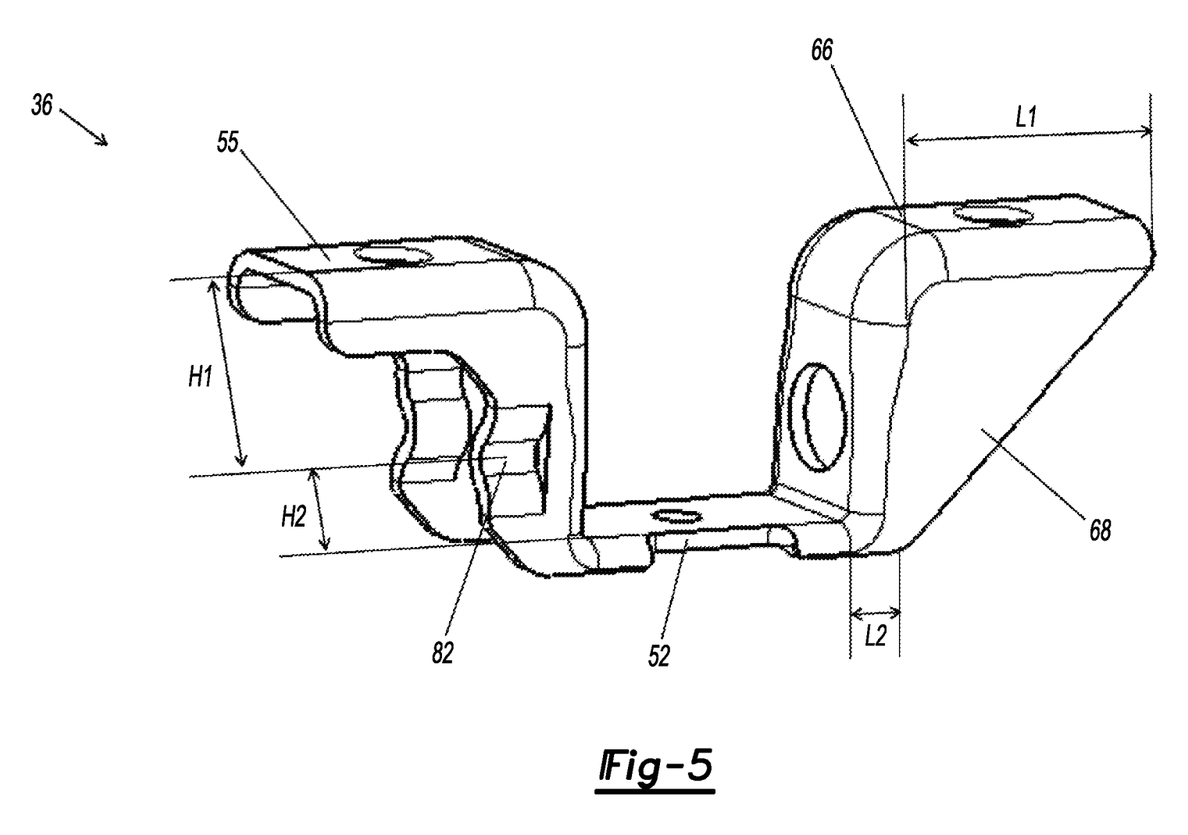
FIG. 5 illustrates a perspective view of the reinforcement bracket illustrated in FIG. 4 including dimensions.

Referring to FIG. 5, the reinforcement bracket 36 with exemplary dimensions is illustrated. In one or more embodiments, one or more of the vertical walls 58, 60, 68, 70 may be tapered between the bottom wall 52 and the top walls 55, 66. As an example, the top portion of the vertical wall 68 may define a length L1 and a bottom portion of the same may define a second length L2, that may be less than the length L1. One or more of the tabs 82, 84 may be spaced apart from the top wall 55 by a predetermined height so that the tabs 82, 84 engage the end stop 32. As an example, the tab 82 may be spaced apart from the top wall 55 by a first height H1 and from the bottom wall 52 by a second height H2, that may be less than the first height.

Figure 6:
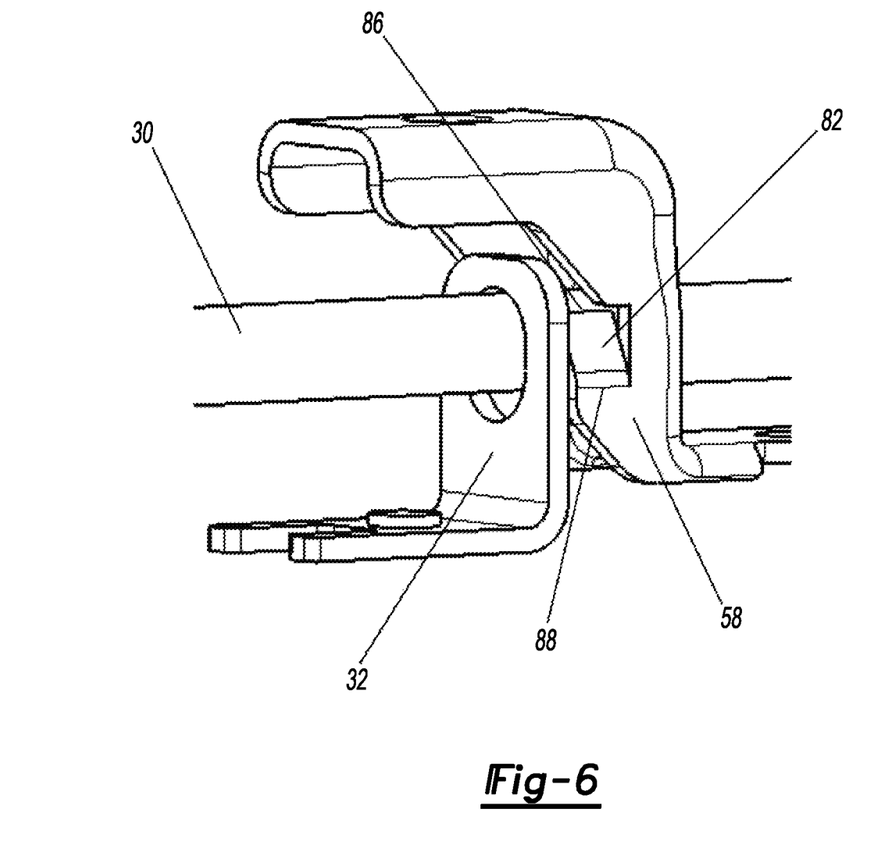
FIG. 6 illustrates a partial-perspective view of an exemplary reinforcement bracket adjacent to an end stop.

Referring to FIG. 6, an exemplary reinforcement bracket 36 according to one or more embodiments is illustrated. The tab 82 may include a bottom portion 88 that may be connected to the vertical wall and a distal end 86 that may be spaced apart from a portion of the vertical wall 58. As mentioned above, the tab 82 may engage the end stop 32 when the reinforcement bracket 36 is disposed at an end position.

Figure 7:
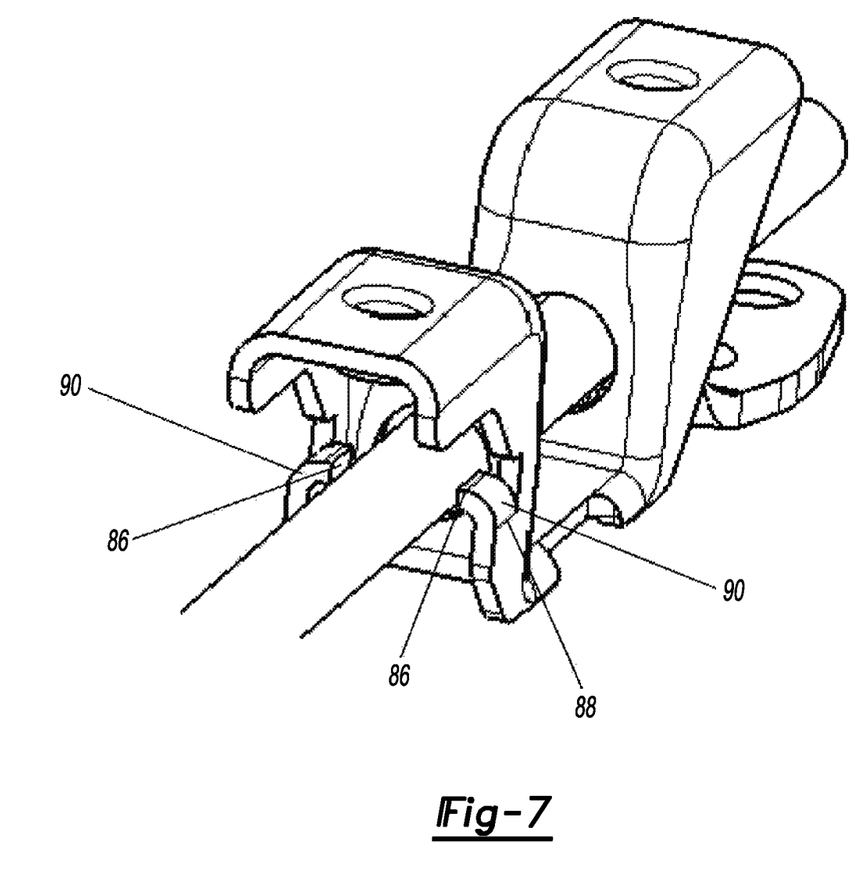
FIG. 7 illustrates a partial-perspective view of an exemplary reinforcement bracket adjacent to an end stop.

Referring to FIG. 7, an exemplary reinforcement bracket 36 according to one or more embodiments is illustrated. As an example, the tabs 82, 84 may include a curved portion 90 that may extend between the distal end 86 and the bottom portion 88.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

- 10 vehicle seat
- 12 rail assembly
- 14 fixed rails
- 16 moveable rails
- 18 cushion
- 20 backrest
- 22 head restraint mechanism
- 23 upper portion
- 24 cushion pan
- 25 exceeding
- 26 movable rail
- 28 fixed rail
- 30 spindle
- 32 end stop
- 34 gearbox
- 36 reinforcement bracket
- 38 threaded extrusions
- 39 spindle assembly
- 40 fastener
- 42 first end portion
- 44 second end portion
- 46 medial portion
- 48 first inner wall
- 50 second inner wall
- 52 bottom wall
- 54 aperture
- 55 first top wall
- 58 first vertical wall
- 60 second vertical wall
- 66 second top wall
- 68 third vertical wall
- 70 fourth vertical wall
- 76 radius
- 78 radius
- 80 protrusions
- 82 tab
- 84 tab
- 86 distal end
- 86 aperture
- 88 bottom portion
- 90 curved portion

What is claimed is:

1. A vehicle seat comprising:
   a fixed bracket;
   a moveable bracket configured to translate with respect to the fixed bracket;
   a spindle defining a longitudinal axis and fixed to either the fixed bracket or the moveable bracket;
   a gearbox coupled to either the moveable bracket or the fixed bracket and provided with a gear that engages the spindle; and
   a reinforcement bracket that receives the gearbox and including,
      a first inner wall and a second inner wall spaced apart from the first inner wall along the longitudinal axis, wherein the first inner wall and the second inner wall each extend in a first direction and define an aperture that receives the spindle,
      a bottom wall extending between the first inner wall and the second inner wall,
      a first top wall extending from the first inner wall along the longitudinal axis in a second direction,
      a second top wall extending from the second inner wall along the longitudinal axis in the third direction, and
      a first vertical wall extending in a fourth direction, different from the first, second, and third directions, from the first top wall and terminating at the first inner wall and the bottom wall.

2. The vehicle seat of claim 1, further comprising a second vertical wall extending in the third direction from the second top wall and terminating at the second inner wall and the bottom wall.

3. The vehicle seat of claim 2, wherein the second vertical wall includes a top portion, connected to the second top wall, and a bottom portion connected to the bottom wall, wherein the top portion has first length and the bottom portion has a second length, less than the first.

4. The vehicle seat of claim 2, further comprising a third vertical wall extending in the third direction from the first top wall and terminating at the first inner wall and the bottom wall.

5. The vehicle seat of claim 4, wherein the first vertical wall includes a first tab and the third vertical wall includes a second tab, wherein the first tab and the second tab each extend towards the longitudinal axis.

6. The vehicle seat of claim 5, wherein the first tab is provided with a first end and a second end each connected to the first vertical wall.

7. The vehicle seat of claim 5, wherein the first tab is provided with a first end and a second end, wherein the first end is spaced apart from the first vertical wall.

8. The vehicle seat of claim 7, wherein the first end is spaced apart from the first top wall by a first distance and the second end is spaced apart from the first top wall by a second distance, greater than the first distance.

9. A vehicle seat provided with a fixed portion, a moveable portion, and a gearbox fixed to the moveable portion and configured to move the moveable portion with respect to the fixed portion, the vehicle seat comprising:
   a reinforcement bracket including a first end portion, a second end portion, and a medial portion extending therebetween,
   wherein the first end portion forms a first U-shaped opening, wherein the first U-shaped opening is formed by a first attachment wall, extending in a first direction, a first reinforcing wall and a second reinforcing wall, each extending in a second direction, different than the first direction, wherein the first attachment is formed by a substantially planar member configured to lie against a section of the moveable portion,
   wherein the second end portion forms a second U-shaped opening, and
   wherein the medial portion forms a third U-shaped opening that receives the gearbox.

10. The vehicle seat of claim 9, wherein the first U-shaped opening is substantially symmetric with respect to the second U-shaped opening.

11. The vehicle seat of claim 9, wherein top portions of the first reinforcing wall and the second reinforcing wall are each curved and terminate at the substantially planar member.

12. The vehicle seat of claim 11, wherein the fixed portion is a first longitudinal rail configured to be coupled to a vehicle floor, the moveable portion is a second longitudinal rail configured to translate along the first longitudinal rail between a first position and a second position to move the vehicle seat in a longitudinal direction.

13. The vehicle seat of claim 12, further comprising a fastener, wherein the substantially planar member defines an opening configured to receive the fastener to fix the reinforcement bracket to the second longitudinal rail.

14. The vehicle seat of claim 13, further comprising a threaded extrusion extending from the second wall and arranged concentric with the opening.

15. The vehicle seat of claim 14, wherein the fastener includes a threaded portion engaging the threaded extrusion and having a diameter that is less than or equal to 7 mm.

16. The vehicle seat of claim 9, further comprising a spindle provided with a number of teeth each configured to engage a gear disposed within the gearbox, wherein the third U-shaped opening is formed by a connecting wall, a first nesting wall and a second nesting wall, each extending from the connecting wall and configured to receive the gearbox and defining an aperture that receives the spindle.

17. The vehicle seat of claim 16, further comprising a protrusion extending from the connecting wall to the first reinforcing wall.

18. A rail assembly for use in a vehicle seat, the rail assembly comprising:
   a fixed rail configured to be coupled to a vehicle floor;
   a translatable rail;
   a spindle fixed to the fixed rail;
   a gearbox disposed on the spindle and configured to carry the translatable rail along the fixed rail; and
   a reinforcement bracket including a first end portion, a second end portion, and a medial portion extending therebetween,
   wherein the first end portion forms a first U-shaped opening, the first U-shaped opening being formed by a first attachment wall, extending in a first direction, a first reinforcing wall and a second reinforcing wall, each extending in a second direction, different than the first direction, wherein the first attachment is formed by a substantially planar member configured to lie against a section of the translatable rail,
   wherein the second end portion forms a second U-shaped opening, and
   wherein the medial portion forms a third U-shaped opening that receives the gearbox.

19. The rail assembly of claim 18, wherein the reinforcement bracket is formed by a material having a tensile strength that is less than or equal to 350 MPa.

* * * * *